(12) United States Patent
Jaggi (10) Patent No.: US 6,854,791 B1
(45) Date of Patent: Feb. 15, 2005

(54) FIBER-REINFORCED THERMOPLASTIC VEHICLE CELL

(75) Inventor: Diego Jaggi, Zürich (CH)

(73) Assignee: RCC Regional Compact Car AG, Kusnacht (CH)

( * ) Notice: Subject to any disclaimer, the term of this patent is extended or adjusted under 35 U.S.C. 154(b) by 0 days.

(21) Appl. No.: 10/111,061

(22) PCT Filed: Oct. 19, 2000

(86) PCT No.: PCT/CH00/00567
§ 371 (c)(1),
(2), (4) Date: Apr. 18, 2002

(87) PCT Pub. No.: WO01/28845
PCT Pub. Date: Apr. 26, 2001

(30) Foreign Application Priority Data

Oct. 20, 1999 (CH) ................................ 1922/99

(51) Int. Cl.⁷ ............................................. B62D 21/00
(52) U.S. Cl. .................................. 296/203.01; 296/204
(58) Field of Search .......................... 296/203.01, 204, 296/901.01, 901; 180/311

(56) References Cited

U.S. PATENT DOCUMENTS

| | | | | |
|---|---|---|---|---|
| 2,144,889 A | * | 1/1939 | Moodie | |
| 4,178,406 A | * | 12/1979 | Russell | 428/283 |
| 4,438,971 A | * | 3/1984 | Zaydel et al. | 296/191 |
| 5,259,661 A | * | 11/1993 | Thum | 296/204 |
| 5,549,352 A | * | 8/1996 | Janotik et al. | 296/203 |
| 5,549,947 A | * | 8/1996 | Quigley et al. | 428/36.2 |
| 5,992,921 A | * | 11/1999 | Seki | 296/204 |
| 6,073,991 A | * | 6/2000 | Naert | 296/203.01 |
| 6,206,458 B1 | * | 3/2001 | Schroeder et al. | 296/901 |
| 6,273,498 B1 | * | 8/2001 | Hillman et al. | 296/203.01 |
| 6,296,301 B1 | * | 10/2001 | Schroeder et al. | 296/203.01 |
| 6,299,246 B1 | * | 10/2001 | Tomka | 296/901 |
| 6,457,768 B1 | * | 10/2002 | Schroeder et al. | 296/214 |
| 6,482,508 B1 | * | 11/2002 | Persson et al. | 428/304.4 |
| 6,503,585 B1 | * | 1/2003 | Wagenblast et al. | 428/34.1 |
| 6,623,067 B2 | * | 9/2003 | Gabbianelli et al. | 296/203.01 |
| 2002/0057004 A1 | * | 5/2002 | Corcoran et al. | 296/203.01 |
| 2002/0185892 A1 | * | 12/2002 | Rima et al. | 296/203.01 |

FOREIGN PATENT DOCUMENTS

| | | | | |
|---|---|---|---|---|
| DE | 44 23 642 C1 | | 7/1994 | |
| EP | 298903 | * | 1/1989 | 296/204 |
| EP | 433903 | * | 6/1991 | 296/203.01 |

* cited by examiner

Primary Examiner—D. Glenn Dayoan
Assistant Examiner—H. Gutman
(74) Attorney, Agent, or Firm—Rankin, Hill, Porter & Clark LLP (57) ABSTRACT

A vehicle cell made of reinforced—reinforced thermoplastic material includes a shape-defining, long-reinforced-reinforced thermoplastic matrix (2) with integrated continuos fiber strands or strips (3). In a base structure (10), which includes a base plate (6), uninterrupted continuous fiber strands running longitudinally (3no) in an upper base area (NO) and continuous fiber strands running longitudinally (3nu) in a lower base area (NU). The upper and the lower base areas are connected with vertical walls (11). This results in an economically manufacturable, light-weight, rigid and safe vehicle cell.

20 Claims, 11 Drawing Sheets

FIBER-REINFORCED THERMOPLASTIC VEHICLE CELL

BACKGROUND OF THE INVENTION

The invention relates to a vehicle cell made of fibre-reinforced, thermoplastic material as well as a method for manufacturing it. Because with fibre-reinforced plastic materials significant advantages versus metal vehicle cells as up until now are able to be achieved, such as corrosion-resistance, noise insulation and weight reductions, it has been attempted for a long time; to create a load-bearing vehicle cell made of fibre-reinforced plastic material, which is capable of being produced in a low-cost series production process. This, however, could not be achieved up to now, because either the structure and the manufacture of a vehicle cell is too elaborate and with it too expensive and also too time consuming, or else because simple manufacturing processes, e.g., short-fibre-reinforced injection moulding, by far do not result in the required high mechanical strength characteristics. Therefore for racing cars and prototypes, for example, vehicle cells in stressed-skin (monocoque) construction made of duroplastic carbon-fibre composite materials are manufactured using autoclave technology, which in essence represents an exceedingly expensive individual unit manufacturing process. On the other hand, for example, in WO97/14602 a plastic vehicle body has been divulged, which is assembled out of four part shells, which shells are manufactured by short-fibre-reinforced injection moulding. With this construction method, however, it is not possible to form a load-bearing passenger cell, because the necessary mechanical strengths and the crash behaviour are not achieved by far, so that in this case a load-bearing, stable steel frame has to be utilised as structural base group and supporting structure.

BRIEF SUMMARY OF THE INVENTION

For this reason, it is the objective of the invention presented here to create a load-bearing vehicle cell made of fibre-reinforced plastic material, this in particular for motor vehicles, which renders possible a low-cost, automatic series manufacture, this both for larger batches as well as for smaller batches of, e.g., 1000 units, which vehicle cell is light-weight and which nonetheless is capable of fulfilling the customary mechanical strength and rigidity requirements, in particular also with respect to the crash behaviour, and which over and above this manifests a good long-term stability with respect to deformation. In particular the known thermoplastic processes with short- or long-fibre-reinforcing, such as injection moulding and press forming are subject to creeping under load, so that a vehicle cell built in a corresponding manner already in a standstill condition would be significantly deformed over the course of the years.

By integrated continuous fibre strands forming a supporting structure, which are pressed together with the long-fibre mass, and by the geometrical arrangement of the continuous fibre strands in a base structure on two levels with a relatively great spacing between them and with vertical connecting walls, a vehicle cell is created, which is light-weight, simple, rapid and cheap to manufacture and which has particularly good mechanical characteristics.

advantageous further developments of the invention are provided, which result in particular benefits for different applications including embodiments with respect to rapid and simple manufacturability, mechanical characteristics, low manufacturing—and assembly costs and also for further additional functions.

BRIEF DESCRIPTION OF THE SEVERAL VIEWS OF THE DRAWINGS

In the following, the invention is described on the basis of exemplary embodiments and Figures. These illustrate.

DETAILED DESCRIPTION OF THE INVENTION

Figure 1:
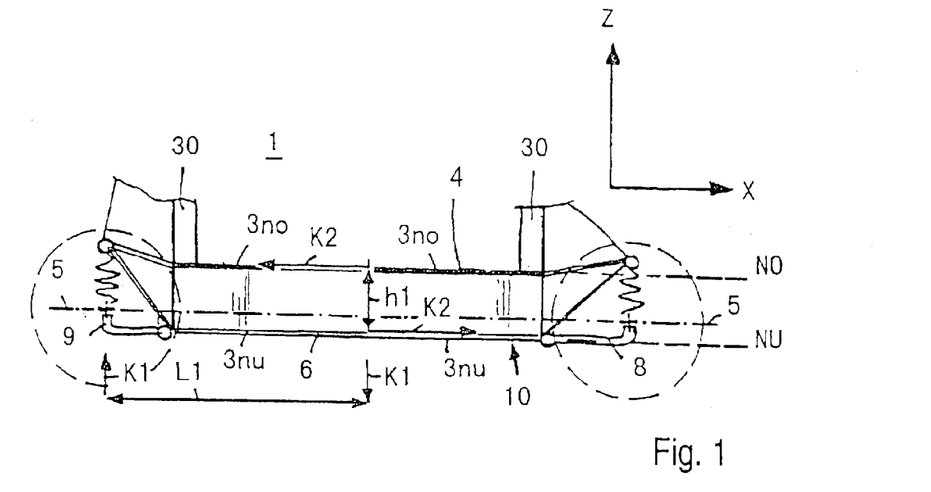
FIG. 1 Schematically the construction of a vehicle cell in accordance with the invention with integrated continuous fibre strands or strips in an upper and a lower base area, FIG. 2 a cross-section through a base structure.

FIG. 1 schematically illustrates the construction of a vehicle cell 1 according to the invention, which is built out of a shape-defining, long-fibre-reinforced thermoplastic matrix 2 with integrated continuous fibre strands or strips 3. The integrated continuous fibre stands form a three-dimensional supporting structure 4, which contains a base structure 10. In the central zone of the vehicle cell, between a front wheel suspension 8 and a rear wheel suspension 9, uninterrupted high-strength continuous fibre strands running in longitudinal direction $3no$ are integrated in an upper base area, level NO, as well as continuous fibre strands $3nu$ running in longitudinal direction in a lower base area, level NU, underneath the axle plane 5. The lower and the upper base area are connected together by walls 11, shown in FIG. 2, transmitting substantially vertical shear forces and the base structure 10 is connected with the front wheel suspension 8 and the rear wheel suspension 9. In order to create a particularly stable and rigid vehicle cell, the relatively large height spacing h1 between upper and lower base area NO, NU in the central zone amounts to at least 15 cm. Depending on the type and the design of the vehicle including a frame construction 30, the height spacing h1 may also amount to 20–30 cm. By the arrangement of the high-strength continuous fibre strands in the two differing base areas, levels NO, NU, with a relatively large height spacing h1, a high stability, rigidity and also a good torque absorption of the vehicle dead weight during standstill is achieved. With this, also a long-term creeping is prevented. This is illustrated in principle by the weight forces K1 with distance L1 and the counterforces K2 in the continuous fibre strands of the levels NO, NU with spacing h1.

(Torque balancing: $K1.L1=K2.h1$)

Figure 2:
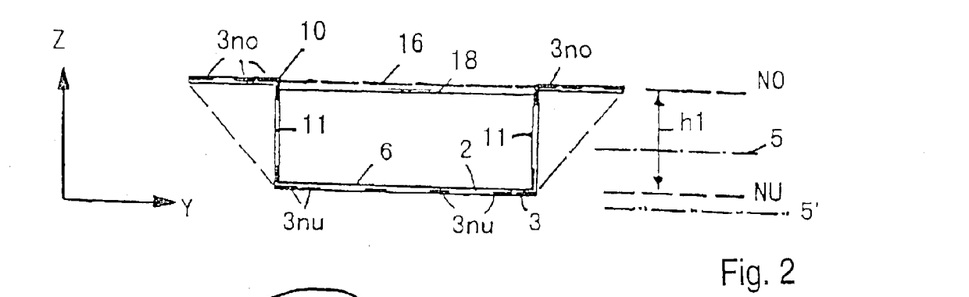

For road vehicles, the upper base area, level NO, is situated above the axle plane 5 and the lower base area, level NU, below the axle plane 5. This results in a favourable absorption by the base structure of all forces occurring due to the running operation, wheel suspension, dead weights and also crash loads. For special vehicles, however, it is also possible to locate both levels NO and NU above or below the axle plane 5, e.g., for vehicles requiring a particularly high ground clearance or for low loaders with especially large wheels. Decisive, however, here too is also a sufficiently great spacing h1 between the two levels. FIG. 2 illustrates an example, where both levels NO and NU are situated above the axle plane 5'.

FIG. 2 in cross-section illustrates a further example of a base structure in accordance with the invention, here as a hat-shaped cross-section, with upper and lower continuous fibre strips or strands $3no$, $3nu$ in the long-fibre matrix 2. Advantageously, a structure of this kind may be reinforced with a box-shaped transverse element 16 with integrated continuous fibre strands 18 running in transverse direction, as is also depicted in FIGS. 4 and 5.

Figure 3:
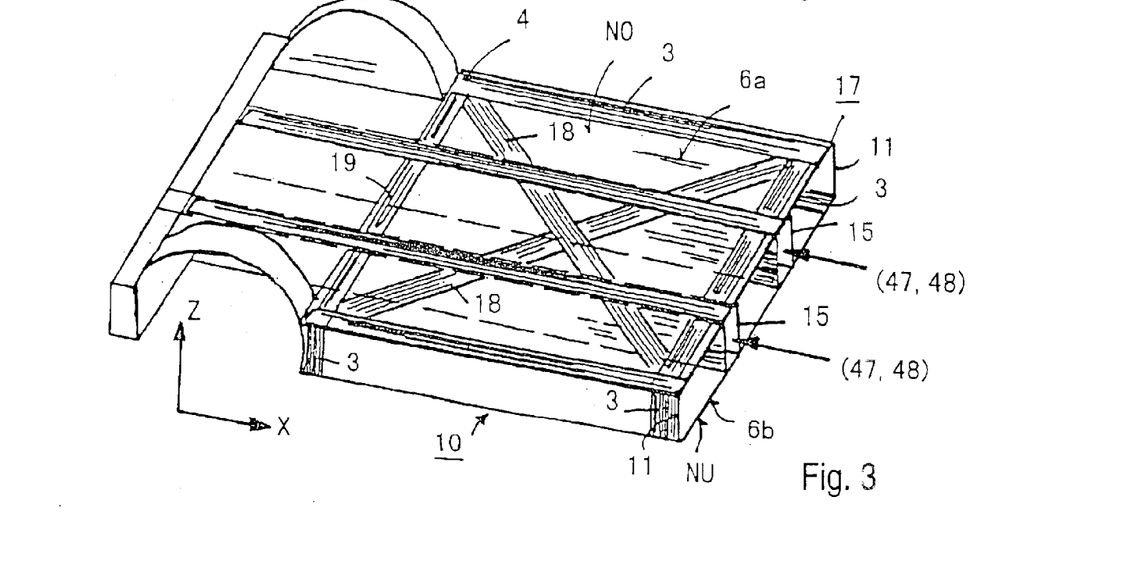
FIG. 3 is a perspective view of a base structure with box-shaped longitudinal elements and diagonal continuous fibre strands.

FIG. 3 illustrates a base structure 10 with box-shaped longitudinal elements 15 with integrated continuous fibre strands 3 running longitudinally in the upper and the lower base areas NO, NU. In this example two uninterrupted internal longitudinal box-shaped elements 15 are contained in the base structure 10, which, for example, are capable of absorbing the forces of a sub-frame 48 (as described in connection with FIG. 7) or of a crash structure 47, wherein here through a large surface area connection by means of gluing and a positive fitting adaptation an impeccable force transmission can be implemented. This example over and above this also illustrates a double base structure 17, shaped out of an upper and lower base plate 6a, 6b, as well as additionally integrated continuous fibre strands or strips running in a transverse —or longitudinal direction 18, 19, which for a lattice-like supporting structure 4.

Figure 4:
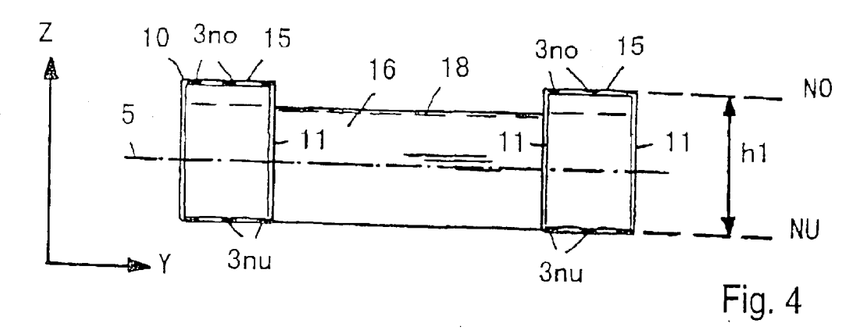
FIG. 4 is a cross sectional view of a base structure with two lateral box-shaped longitudinal elements.

FIG. 4 in cross-section illustrates a further embodiment of a base structure 10 with outer longitudinal box-shaped elements 15, which here have a relatively large height spacing h1 of, e.g., 20–25 cm between the upper and the lower base area NO, NU. These are additionally connected with a rear, box-shaped transverse element 16 with integrated continuous fibre strands 18 running in transverse direction (refer to FIG. 5), so that already with the base structure a particularly torsionally rigid, strong and light-weight vehicle cell is able to be constructed. This is suitable, for example, also for convertibles/roadsters. With this, on the same base structure, different vehicle bodies are capable of being implemented in modular design.

Figure 5:
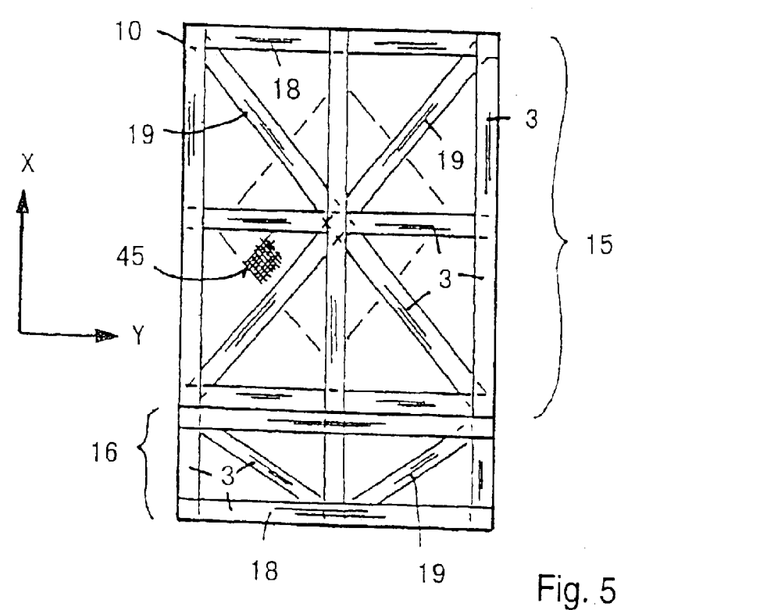
FIG. 5 is a top plan view of a base structure with box-shaped longitudinal and transverse elements.

FIG. 5 illustrates a base structure 10, which comprises box-shaped longitudinal elements 15 as well as a boxshaped transverse element 16. The supporting structure here, apart from the integrated longitudinal continuous fibre strands 3, also comprises continuous fibre strands running in transverse and diagonal directions 18, 19 and also in complement an additionally integrated sheet-like fibre fabric 45 as a reinforcement for increasing the resistance against shearing. The distribution and the arrangement of the continuous fibre strands 3 in the whole vehicle cell in general is implemented in accordance with the forces occurring.

Figure 6:
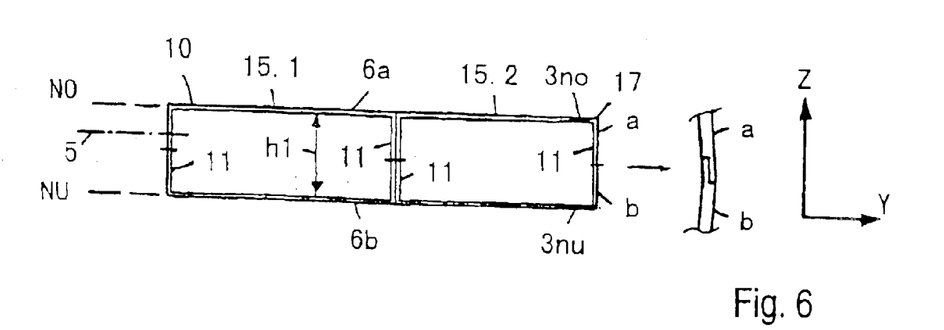
FIG. 6 is a cross sectional view of a double-base structure formed out of two half-shells, FIG. 7 a side elevational view of an example of a vehicle cell with base structure and frame construction.

FIG. 6 in cross-section schematically illustrates an example of a double base structure 17 formed out of two half-shells a and b with an upper and lower base plate 6a, 6b. The double base here comprises two box-shaped longitudinal elements 15.1, 15.2. The connection of the two half-shells a and b can be implemented by thermoplastic welding, gluing or also bolting and riveting, wherein a positive fitting adaptation of the parts a and b is additionally advantageous. Also the examples of the FIGS. 10a–c and 13a–b are each respectively composed of two halfshells a and b. For the pressing process, all vertical walls have to have a minimum mould release incline of, e.g., 1.5–2°. This is also applicable for ribs and beadings.

Figure 7:
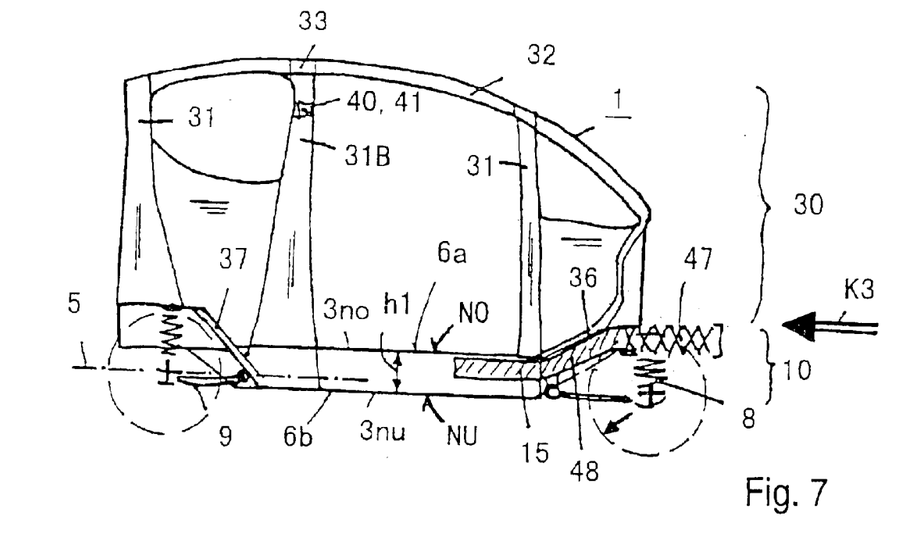
Figure 11:
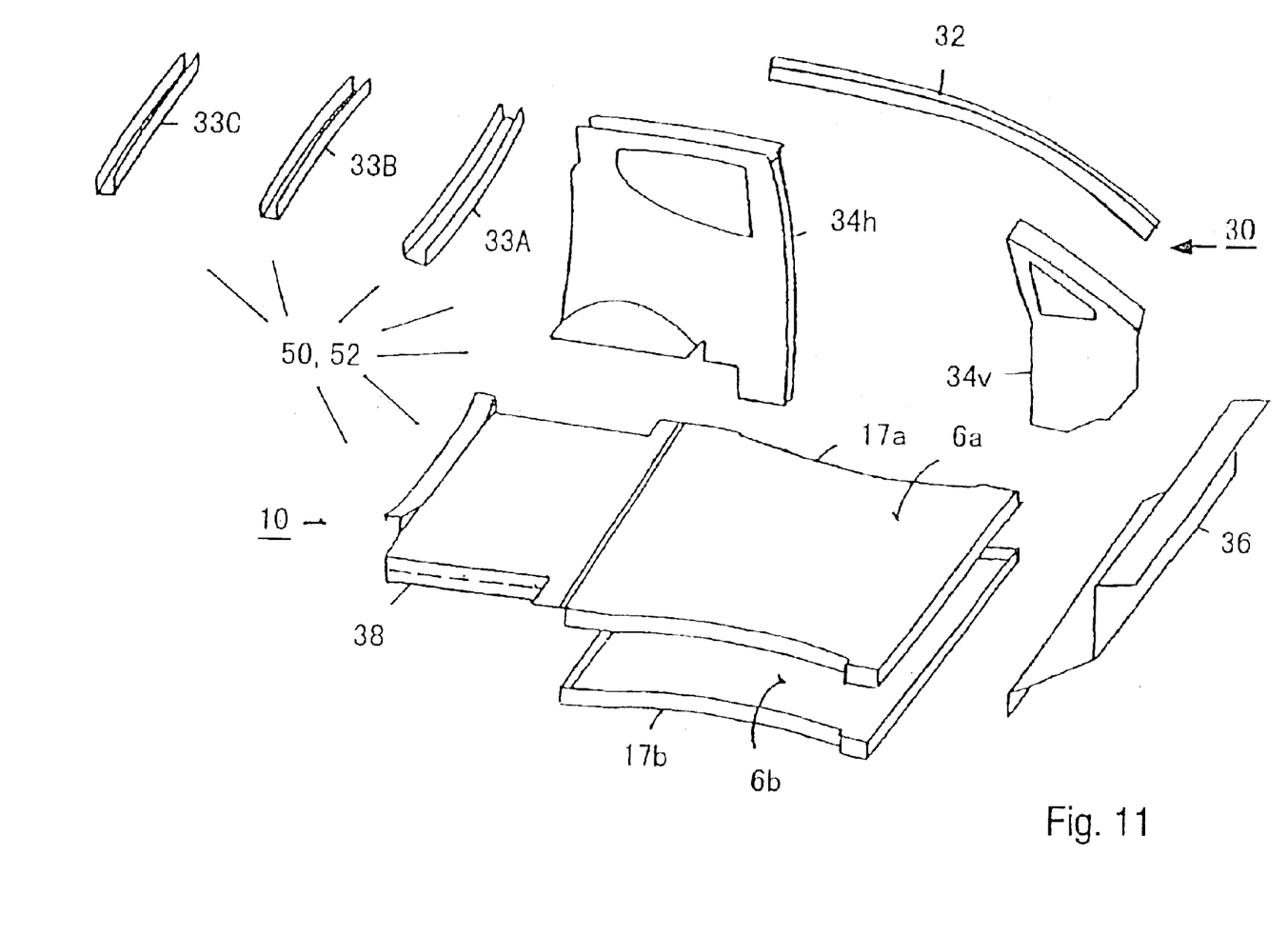
FIG. 11 is an exploded view of the assembling of a vehicle cell made out of several components.

FIG. 7 illustrates an example of a vehicle cell 1 with a base structure 10 and a frame construction 30 connected with it, which consist of various components: of lateral support struts front and rear 31 roof support struts 32 and roof spars or transverse connections 33, a splashboard 36 and a rear transverse wall 37 (refer to FIG. 11). A metallic sub-frame 48 for the front wheel suspension 8 is inserted into the double base structure or into box-shaped longitudinal elements 15 (as depicted in FIG. 3) with a large surface area and a positive fit into the base structure 10 and connected with the vehicle cell. Arranged on this sub-frame 48 is also a crash element 47. These are designed in such a manner with the wheel suspension 8, that in the case of a collision (K3), the front structure is compressed over a deformation distance and is capable of being deviated underneath the vehicle cell, if at all possible without any impairment of the vehicle cell. Illustrated on the B-column 31B of the frame construction here over and above is an integrated metallic insert 40 in the form of a force transmission element 41 for attaching the safety belts. This is also illustrated in FIG. 8b. The rear suspension 9 in analogy is also connected with the base structure 10 by means of suitable force transmission-elements.

Figure 8A:
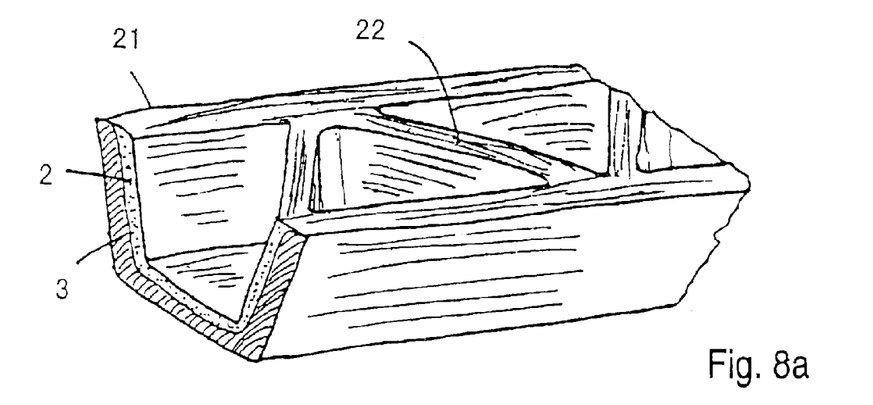
FIG. 8a is a perspective view of a semi-open supporting strut profile.
Figure 8B:
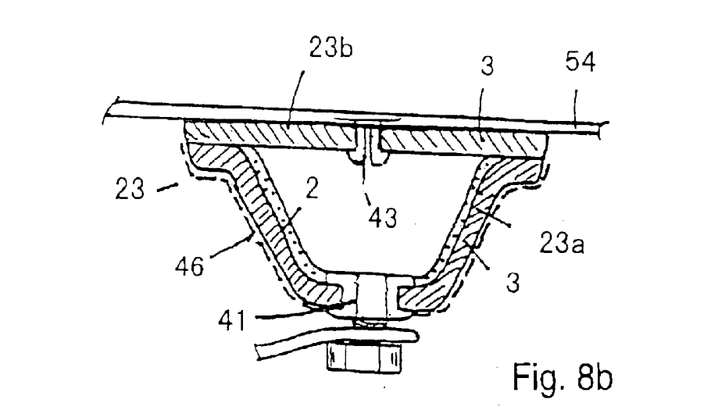
FIG. 8b is a cross sectional view of a closed supporting strut profile.

The FIGS. 8a and b illustrate support strut profiles of the frame construction 30 with integrated U-shaped continuous fibre strands 3 in the long-fibre matrix 2. FIG. 8a depicts a semi-open support profile 21 with a long-fibre rib structure 22 as an additional reinforcement and stiffening element.

FIG. 8b illustrates hat-shaped profile 23a, which together with a cover 23b is connected to form a closed profile 23.

Also this connection of the parts a and b, for example, may be implemented by means of thermoplastic welding. Closed profile parts 23 are preferably utilised in particularly highly stressed zones, for example, for the absorption of forces, as is illustrated here with the integrated force transmission element 41, e.g., for a safety belt attachment point. In FIG. 8b it is furthermore illustrated, that to the vehicle cell and to the frame construction non-load-bearing, flat plastic components 54 are able to be attached as the outside of the body. Plastic light-weight body components of this kind can be easily manufactured, e.g., by injection moulding. This results in a particularly light-weight vehicle body. The plastic components 54 in doing so, may, e.g., be glued to the vehicle cell or else also be attached by means of fixing elements 43, such as clips, so as to be removable and interchangeable. FIG. 8b furthermore illustrates a surface lamination 46 for the interior, which can be implemented in a common manufacturing step, in that long-fibre matrix 2, continuous fibre strands 3 and a surface lamination layer 46 are pressed together with one another.

Figure 12:
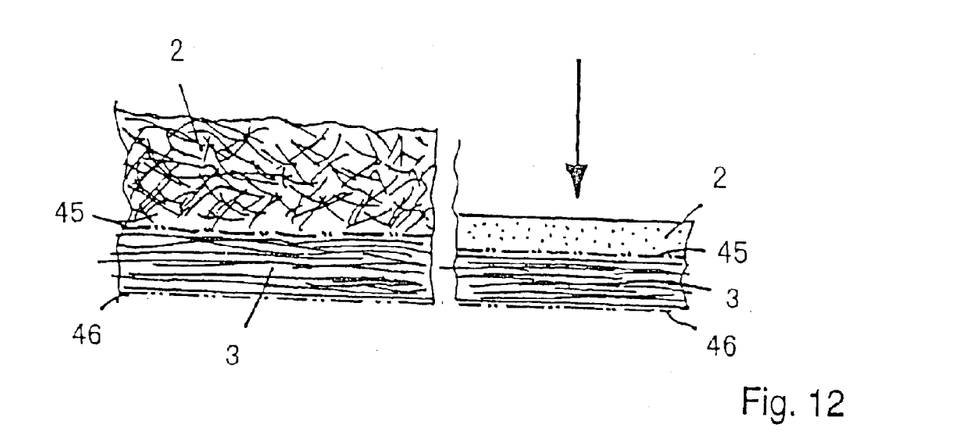
FIG. 12 is a cross sectional view that illustrates the manufacture of structural components out of long-fibre matrix and integrated continuous fibre strands.

The method for the manufacture of vehicle cells, or of vehicle cell components according to the invention is illustrated in FIG. 12. The left side depicts the cottonwool-like, molten long-fibre-reinforced matrix material 2 containing air prior to being pressed, which has been applied to preconsolidated molten continuous fibre strands 3 positioned in a press mould. During pressing, the air is squeezed out of the long-fibre matrix and an intimate connection with the integrated continuous fibre strands 3 of the supporting structure is established, so that as a result of the pressing process in a single step a compact structure in accordance with the right side of FIG. 12 is produced, without any detrimental air inclusions. The intimate thermoplastic connection (fusion) of the long-fibre matrix with the continuous fibre strands results in an optimum force transmission and distribution in the three-dimensional supporting structure 4. Over and above, in this combined process it is also possible to install a surface lamination 46 on one side or, for example, a reinforcing fabric 45 may be installed between the continuous fibre strands or strips 3 and the long-fibre matrix 2 (refer to FIG. 5) and pressed together with one another in a single step.

The vehicle cell and the base structure are assembled out of several components or elements 50, wherein impeccable force-transmitting connections between the different components are produced. In principle, this can take place by thermoplastic welding, by gluing or else also by bolting-on integrated metal inserts, preferably assisted by a positive fitting adaptation of the various components.

Figure 9A:
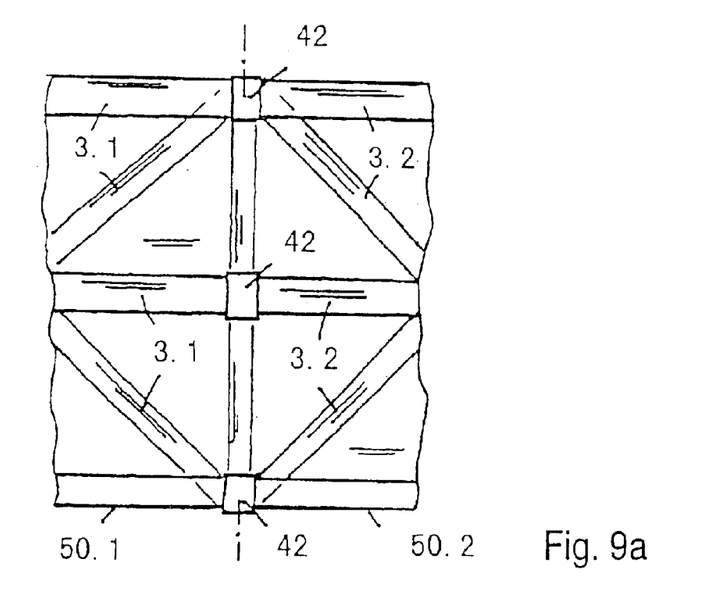
FIG. 9a is a top plan view of two assembled parts of a vehicle cell with load transmitting connections.
Figure 9B:
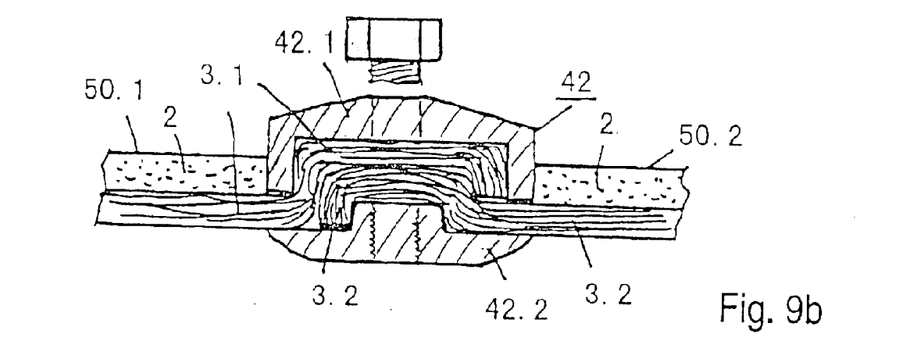
FIG. 9b is a cross sectional view of two assembled parts of a vehicle cell with load transmitting connections.

In the example of FIGS. 9a, 9b, force-transmitting connections 42 between the continuous fibre strands 3.1, 3.2 of the two components 50.1, 50.2 are established. Here these, for example, are metallic connecting elements 42.1, 42.2, which are integrated into the components 50.1, 50.2 with a positive fit as inserts. These form a positive fitting connection, which by bolting can easily be attached and also removed again.

Figure 10A:
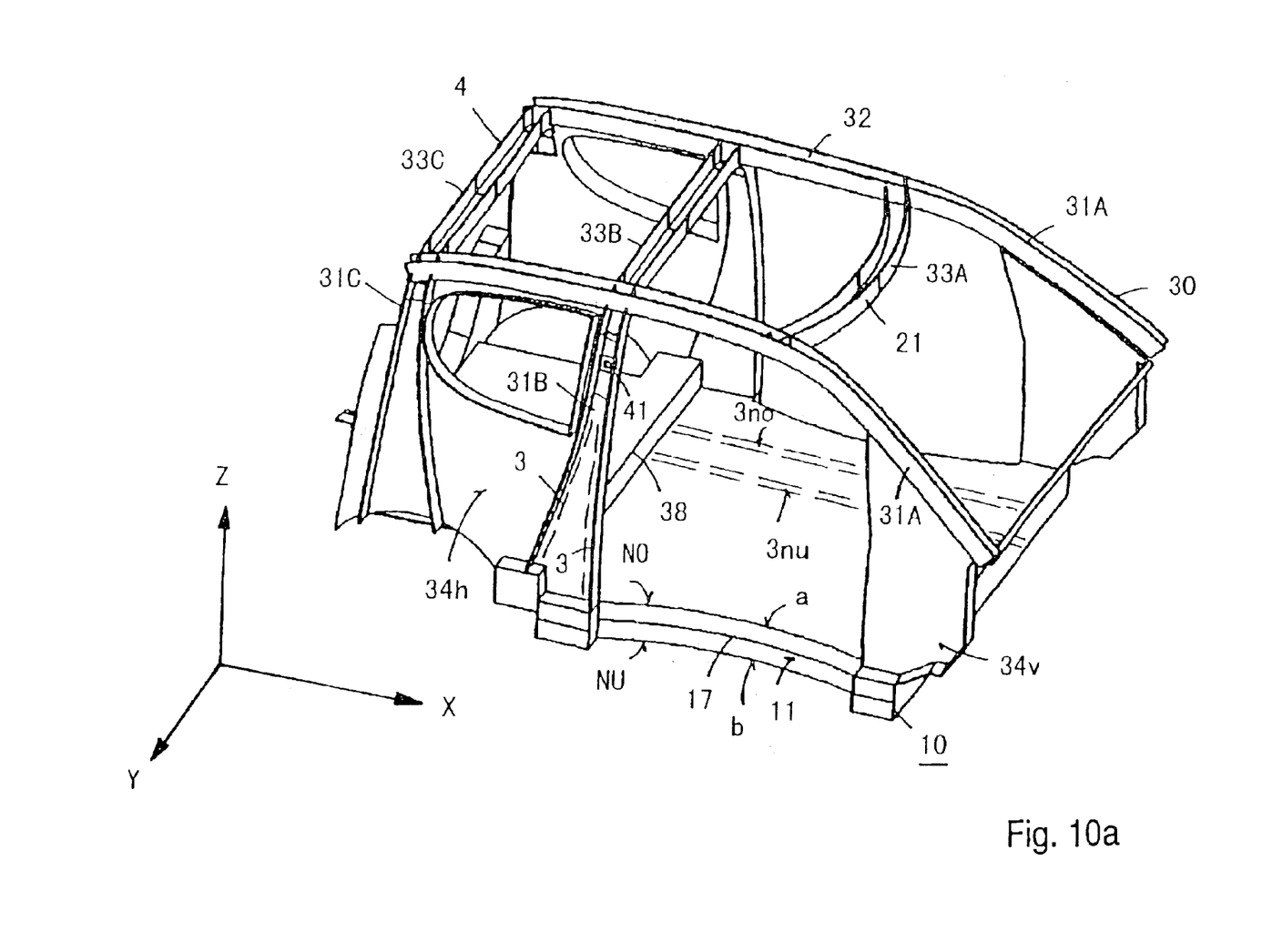
FIG. 10a is a perspective view of a further example of a vehicle cell with integrated continuous fibre supporting structure.
Figure 10B:
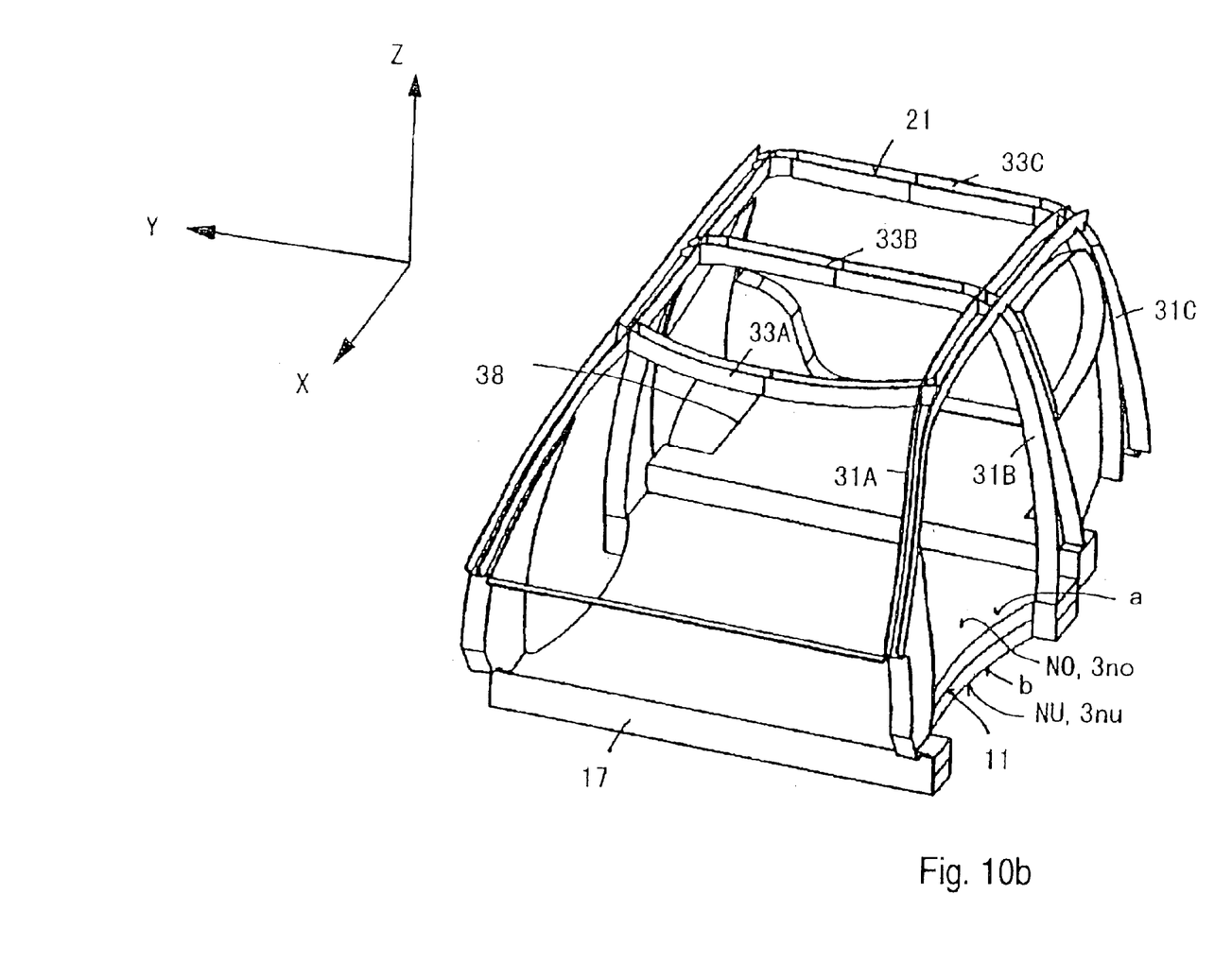
FIG. 10b is an alternate perspective view of the further example of FIG. 10a of a vehicle cell with integrated continuous fibre supporting structure.
Figure 10C:
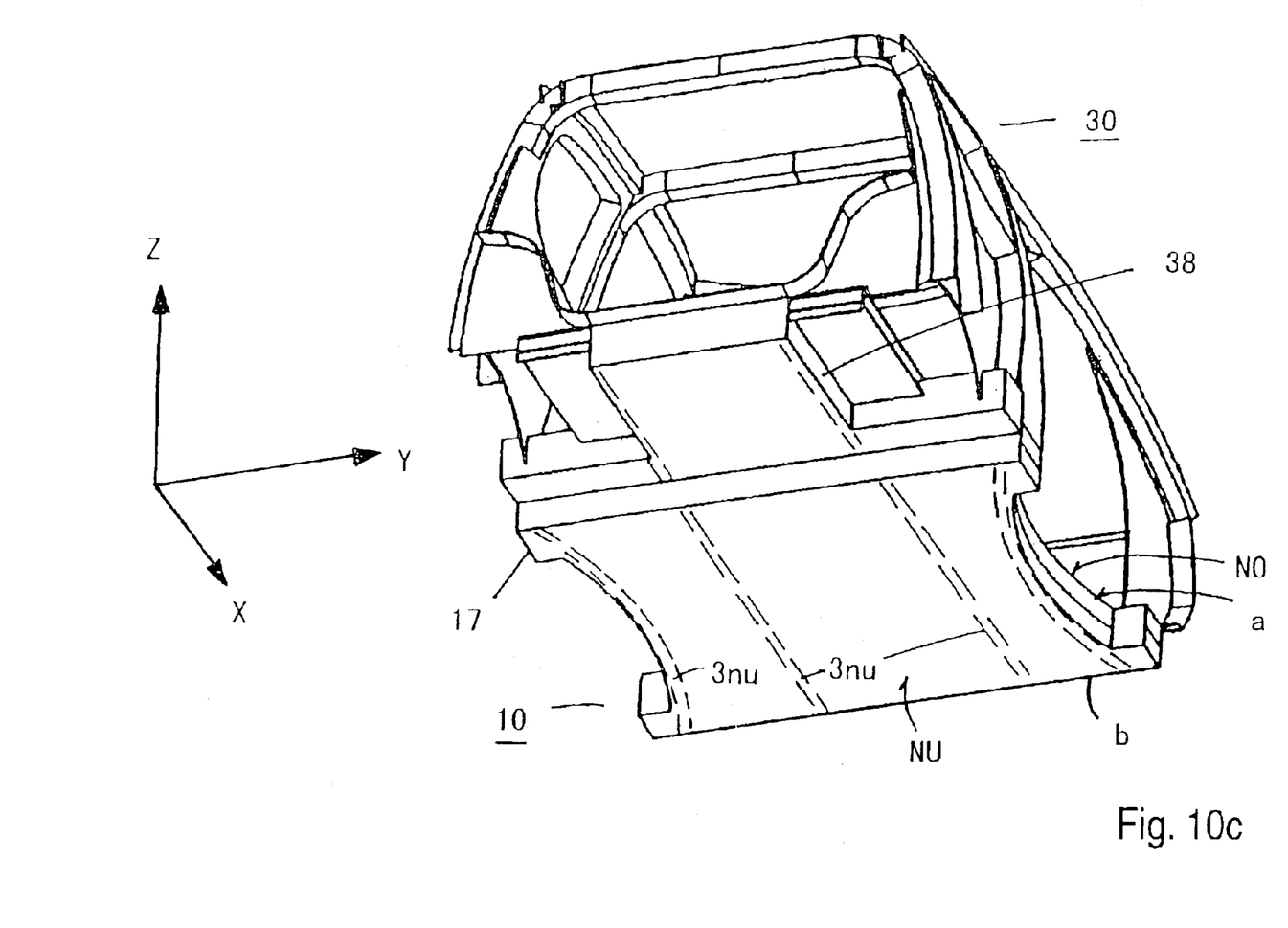
FIG. 10c is yet another alternate perspective view of the further example of FIG. 10a of a vehicle cell with integrated continuous fibre supporting structure.

FIGS. 10a, b, c in three different perspective views illustrate a further example of a vehicle cell 1 with integrated three-dimensional supporting structure 4 made out of continuous fibre strands 3, which also comprises a double base 17 consisting of two shells a and b as well as an elevated rear box-structure 38.

The example of FIG. 11 illustrates the assembling of a vehicle cell 1 out of different components 50. Here once again a two-part double base 17a, b with upper and lower base plate 6a, 6b as well as front and rear side walls 34v, 34h, roof support strut 32, transverse connections 33A, 33B, 33C, a splashboard 36 and a rear box structure 38 are illustrated as components of the vehicle cell. The components 50 can also be designed as finished modules 52 (e.g., with connections and surface laminations), so that the vehicle cell is capable of being assembled by simply connecting the modules, e.g., by means of bolting (FIG. 9).

Figure 13A:
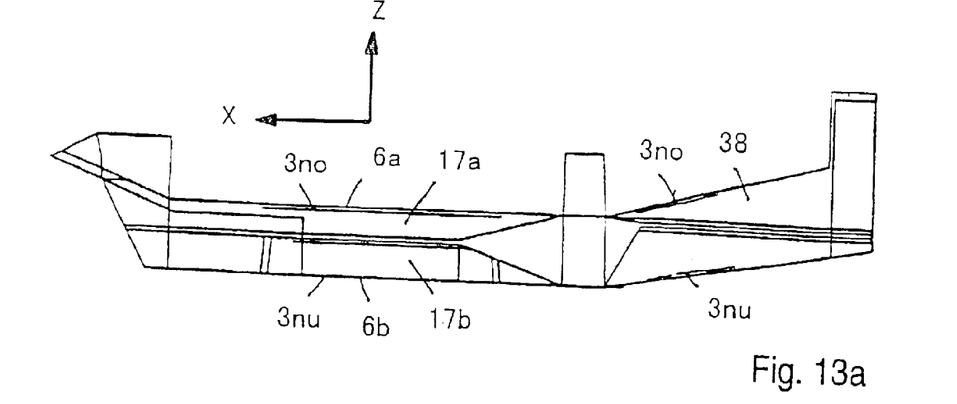
FIG. 13a is a side elevational view of a further example of a double-base structure with ribbings and beadings.
Figure 13B:
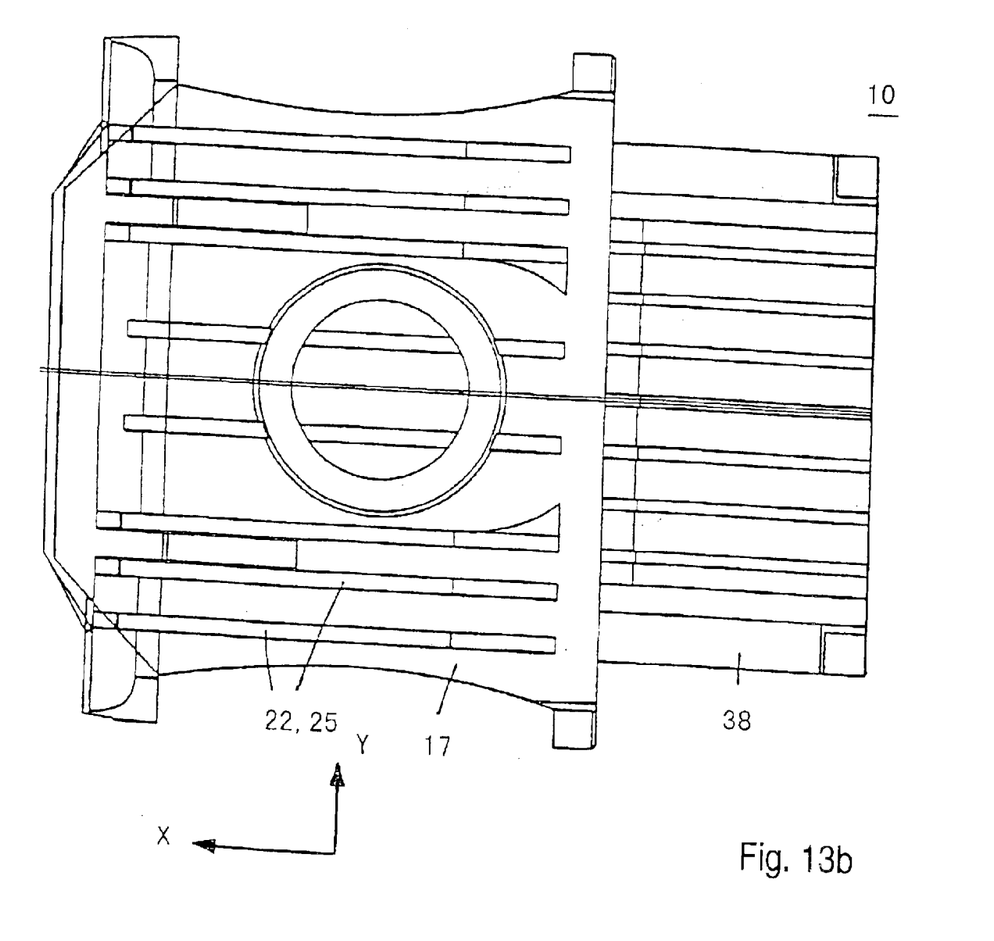
FIG. 13b is a top plan view of a further example of a double-base structure

FIGS. 13a, b illustrate a further example of a two-shell double base structure 17, which comprises additional stiffening ribs 22 and beadings 25 in the base plates 6.

Figure 14:
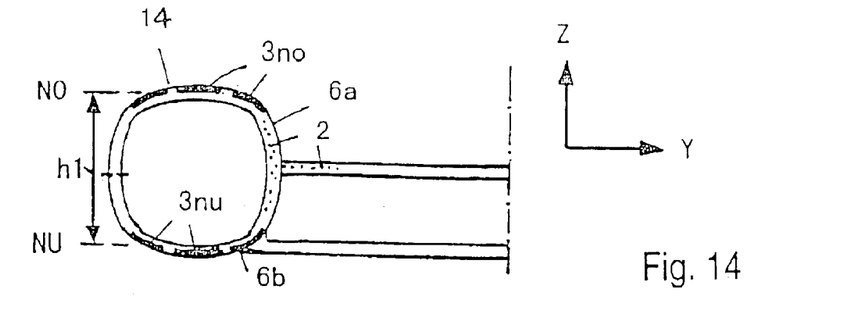
FIG. 14 is a cross sectional view of an example with rounded longitudinal support struts.
Figure 15:
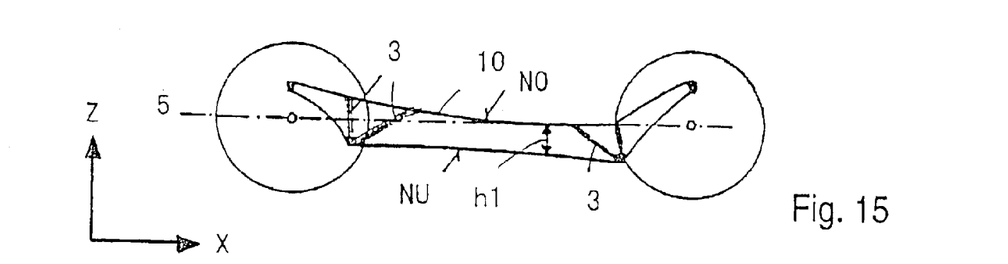
FIG. 15 is a side elevational view of a base structure with non-plane base areas.
Figure 16:
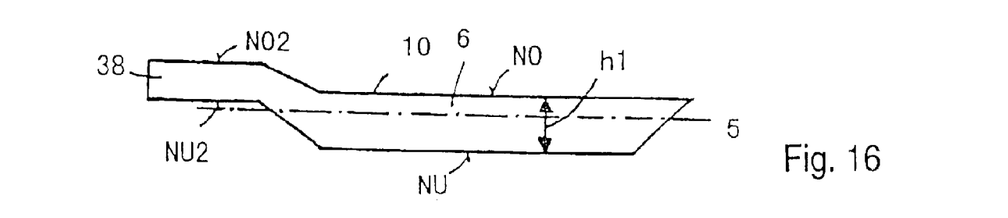
FIG. 16 is a side elevational view of a base structure with stepped base areas.

The FIGS. 14–16 illustrate examples of base structures with non-plane base areas NO, NU, this both with respect to the transverse direction Y in FIG. 14 as well as with respect to the longitudinal direction X in FIGS. 15 and 16. It is important that the height spacing h1 between the two levels is sufficiently great, so that a major proportion of all occurring forces and torques are capable of being absorbed by the base structure. These forces and torques substantially are mass forces during standstill, driving forces on the wheel suspensions during operation as well as impact forces from different directions in the case of a crash. In this, these forces have to be absorbed by the vehicle cell, i.e., the base structure with the frame construction, wherein always a substantial proportion is taken over by the base structure.

FIG. 14 in a cross-section illustrates a rounded, tubular longitudinal support strut 14 (in analogy to the box-shaped support strut 15 in FIG. 4), which, e.g., forms a side bulge and is also formed out of two half-shells 6a and 6b.

FIG. 15 in a longitudinal section illustrates a base structure 10 with a curved upper base area NO slightly declined in forward direction and a lower base area NU. For illustration purposes, here also additional diagonal continuous fibre strands 3 in the side walls 11 are depicted. The side walls 11, also absorb shear forces.

FIG. 16 illustrates a stepped base structure 10 with a lower front main base 6a, 6b and a smaller, higher rear base part 38 wherein both once again are assembled out of two half-shells a and b. The main base areas NO, NU are supplemented by the rear base areas N02, NU2, with a force-transmitting transition between the different levels.

Figure 17:
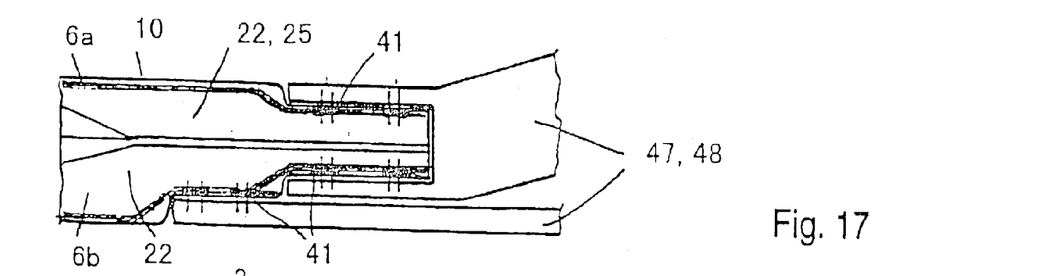
FIG. 17 is a cross sectional view of a connection of base structure with a sub frame.

FIG. 17 illustrates a connection transmitting forces and torques from a sub-frame 48, or from a wheel suspension and crash elements 47 onto a base structure 10. Serving this purpose on the one hand are large-surface force transmission areas, e.g., by means of gluing, as well as—as illustrated here—bolted connections with integrated force transmission elements 41, which transmit forces onto the continuous fibre strands 3 in the base structure. This force transmission to the base structure is additionally assisted by reinforcements in the form of ribs 22 and beadings 25 in the highly stressed zones.

Figure 18:
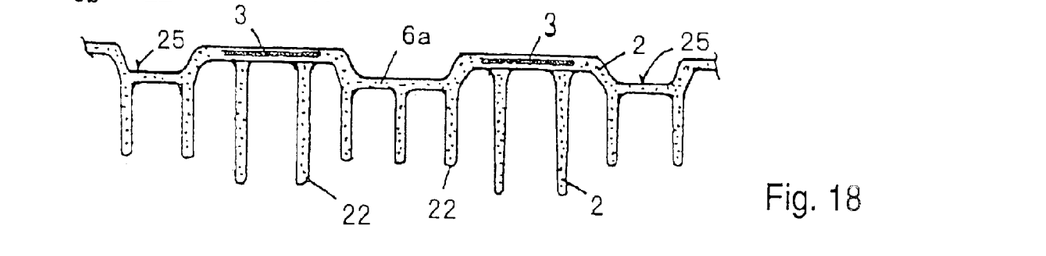
FIG. 18 is a cross sectional view of a reinforcement of the base structure by means of ribs and beadings.

FIG. 18 illustrates a reinforcement and stiffening of this type by means of ribs 22 and beadings 25 in the long-fibre matrix 2 in combination with the integrated continuous fibre strands 3. This is depicted here on an upper base half-shell 6a.

Figure 19:
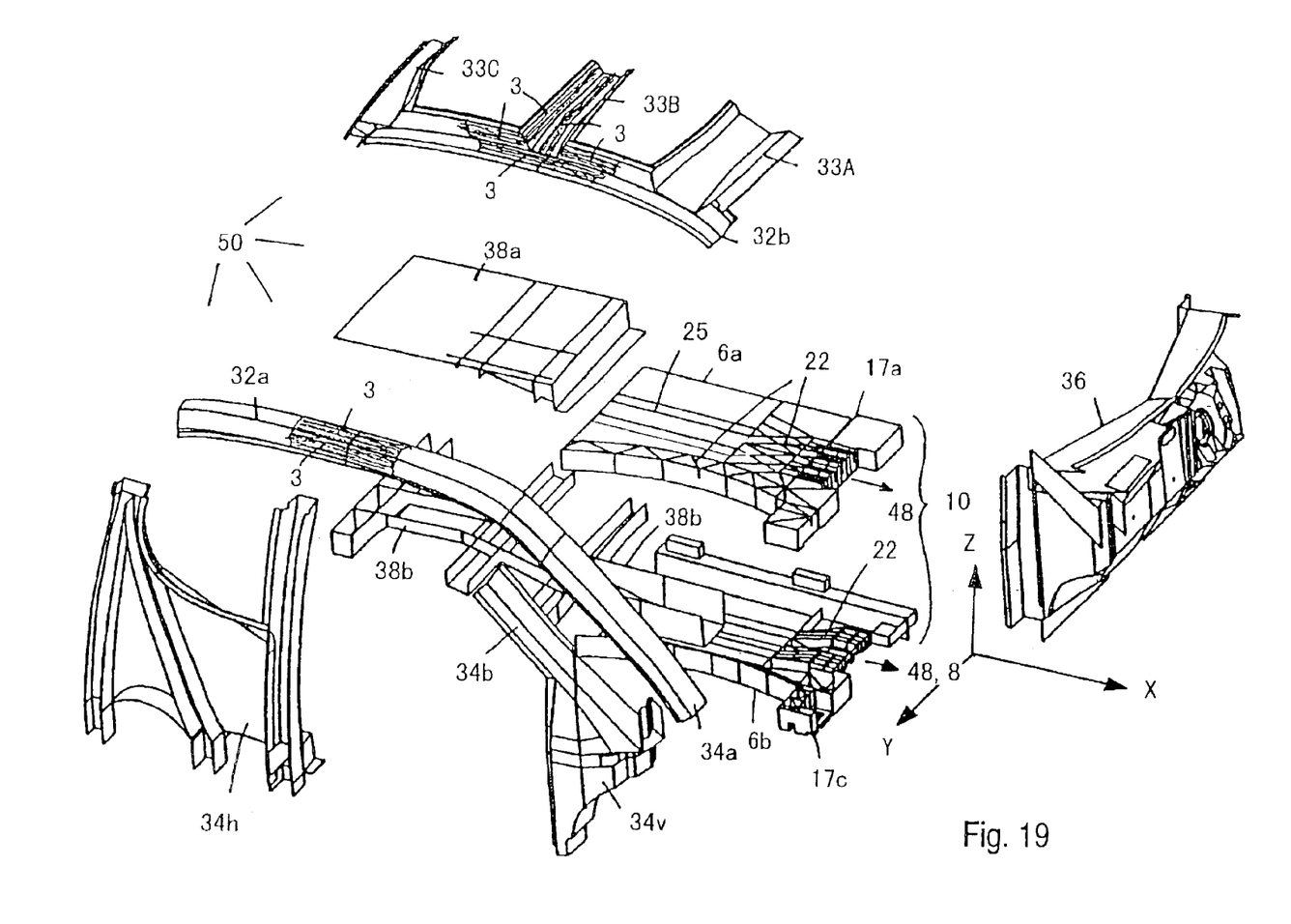
FIG. 19 is an exploded view of a further example of a vehicle cell assembled out of few components.

FIG. 19 illustrates a further example of a vehicle cell of a five-seat limousine, similar to the example of FIG. 11, which is assembled in a very simple manner out of relatively few components 50. This vehicle cell comprises a front wall or splashboard 36 extending over the whole width as well as right-hand and left-hand components mirrored respectively at the centre plane (X, Y), of which in FIG. 19 only the components of the right side are illustrated.

Of the following components, respectively a right-hand and a left-hand part exists:
Base structure 10 with
Base plate front top, 6a
Base plate front bottom, 6b
Base structure rear top 38a
Base structure rear bottom 38b
Frame construction 30 with
Side wall rear with B- und C-column 34h
Side wall front 34v with A-column 34b
Roof support strut top 32a with A-column 34a
Roof structure with support strut 32b, and roof spars 33A, 33B, 33C (at A-, B- and C-columns)

Of these components, respectively the following parts together each form double base structures or closed, rigid box profiles with relatively large cross-sectional surface areas:
the base plates 6a and 6b form a double base 17,
the base structures 38a and 38b also form a double base box structure 38,
the roof support struts 32a with A-column 34a and roof structure 32b as well as the A-column 34b together form a closed roof frame 32.

Overall, this vehicle cell therefore is composed of 17 components. Not illustrated in FIG. 19 are a left-hand and right-hand door as well as a rear flap/tailgate, which as further, separate components are also manufactured in the same manner with long-fibre matrix and integrated continuous fibre strands. Also the metallic support struts or subframes 48 for the wheel suspensions and possible crash elements are illustrated in the Figure, these are integrated in or bolted on to the base structure at the designated points 48, wherein the force-transmitting areas of the base structure are reinforced with ribs 22 and beadings 25 in addition to the force-absorbing continuous fibre strands. For illustration purposes, in the roof area some continuous fibre strands 3 are depicted, in order to illustrate how these continuous fibre strands are integrated into the complete structure.

The assembling of these components 50 into the complete vehicle cell 1 can be effected by means of welding the thermoplastic matrix, by gluing as well as by force-transmitting connections between the continuous fibre strands.

Suitable as matrix materials are, for example, thermoplastic materials such as polypropylene (PP), polyamides (PA), polyethylene-terephthalate (PET), polybuthylene-terephthalate (PBT) and as fibre reinforcements above all fibre glass, depending on the requirements, however, also carbon—or aramide fibres, with a fibre content in the continuous fibre strands of, e.g., 35–60% by volume and in the long-fibre matrix of, e.g., 15–25% by volume. The strands may comprise differing cross sections and fibre structures. The simplest are UD-strands with parallel fibres, depending on the application, however, also wide, flat strips, for example, also in a combination of longitudinally—and diagonally oriented continuous fibres, may be utilised. The long-fibre mass in plane zones may, for example, have a thickness of 2–4 mm and the continuous fibre strands 3, for example, a thickness of 2–5 mm and a width of some centimetres.

With the vehicle cell in accordance with the invention, great weight reductions in comparison with the conventional steel construction method are capable of being achieved. The construction in components 50 with relatively compact dimensions for the pressing process requires correspondingly smaller presses and press forces. In comparison with the manufacture of stressed-skin (monocoque) steel bodies up to now, as a result significantly lower investments in production facilities are necessary.

Within the scope of this description, the following designations are utilised:
NO upper base area, level
NU lower base area, level
h1 height spacing/distance
3no in NO
3nu in NU
a, b half-shells
K1, K2, K3 forces
L1 torque distance
X, Y, Z spatial directions
1 vehicle cell
2 long-fibre matrix, mass
3 continuous fibre strands, strips
4 supporting structure
5 axle plane
6 base plate
8 front wheel suspension
9 rear wheel suspension
10 base structure
11 vertical walls
14 rounded longitudinal support strut
15 box-shaped longitudinal elements
16 box-shaped transverse elements
17 double base
18 transverse continuous fibre strands
19 diagonal continuous fibre strands
21 semi-open support strut profiles
22 ribbing, ribs
23a, b closed support strut profiles
25 beadings
30 frame construction
31 lateral support strut
31A, B, C A, B, C-column
32 roof support strut
33 transverse connections, roof spars
34 side wall
36 splashboard
37 rear transverse wall
38 rear box structure, base
40 inserts
41 force transmission element
42 connecting element
43 fixing element
45 reinforcing fabric
46 surface lamination
47 crash elements
48 sub-frame
50 components of 1, 10
52 finished modules
54 plastic body components

What is claimed is:
1. A vehicle cell made of fiber-reinforced thermoplastic material, comprising a shape-defining, thermoplastic matrix (2) having long fibers therein for reinforcement and additionally with integrated continuous fiber strands or strips (3), which combined form a supporting structure (4),
with a base structure (10), which comprises a base plate (6) and, in a central zone,
a first set of longitudinally running, uninterrupted continuous fiber strands (3no) integrated into the long fiber-reinforced thermoplastic matrix (2) in an upper base area (NO) and
a second set of longitudinally running continuous fiber strands (3nu) integrated into the long fiber-reinforced thermoplastic matrix (2) in a lower base area (NU) underneath or near the axle plane (5), wherein the upper and the lower base areas are connected with vertical walls (11) and wherein a height spacing (h1) between the upper and lower base areas (NO, NU) amounts to at least 15 cm and the base structure is connected with a front wheel suspension (8) and a rear wheel suspension (9).

2. The vehicle cell in accordance with claim 1, wherein the upper base area (NO) is situated above the axle plane (5) and the lower base area (NU) is situated underneath the axle plane.

3. The vehicle cell according to claim 1, wherein the base structure (10) comprises box-shaped longitudinal elements (15) with the first and seconds sets of integrated continuous fiber strands (3) running longitudinally.

4. The vehicle cell according to claim 1, wherein the base structure also comprises third and fourth sets of continuous fiber strands (3) running in a transverse direction (18) and diagonally (19) respectively.

5. The vehicle cell according to claim 1, wherein the base structure (10) at least in certain areas comprises two abutting half shells forming a box-shaped double base (17) with the first and second sets of integrated continuous fiber strands (3).

6. The vehicle cell according to claim 1, wherein the base structure comprises at least one box-shaped transverse element (16) with a third set of integrated continuous fiber strands running in transverse direction (18).

7. The vehicle cell according to claim 1, wherein the vehicle cell contains box-shaped elements, which are composed of two half-shells (a, b).

8. The vehicle cell according to claim 1, wherein the base structure (10) for stiffening purposes comprises ribs (22) and beadings (25) made of long-fiber mass.

9. The vehicle cell according to claim 1, further comprising a frame construction (30) connected with the base structure with lateral support struts (31), roof support struts (32) and transverse connections (33).

10. The vehicle cell according to claim 9, wherein the frame construction includes semi-open, U-shaped support strut profiles (21) with integrated continuous fiber strands (3) and with additional long-fiber ribbing (22).

11. The vehicle cell according to claim 9, wherein the frame construction (30) includes closed support strut profiles (23) with additional integrated continuous fiber strands (3).

12. The vehicle cell according to claim 1, wherein the base structure comprises a front splashboard (36) and a rear wall (37) or a rear box structure (38).

13. The vehicle cell according to claim 1, further comprising, in front or at a rear thereof, crash elements (47) with a predefined deformation distance, and which are also active between the base structure (10) and the wheel suspensions (8, 9).

14. The vehicle cell according to claim 1, wherein the front wheel suspension or the rear wheel suspension comprise metallic sub-frames (48), which are integrated into the base structure (10).

15. The vehicle cell according to claim 1, wherein the supporting structure (4) as force transmission (41) or as connecting elements (42) contains integrated metallic inserts (40).

16. The vehicle cell according to claim 1, wherein the vehicle cell and the base structure are composed of several elements or components (50), wherein force-transmitting connections (42) exist between additional continuous fiber strands (3) of the several components (50.1, 50.2).

17. The vehicle cell according to claim 1, wherein the first and second sets of integrated continuous fiber strands (3) form a three-dimensional supporting structure (4).

18. The vehicle cell according to claim 1, wherein the cell is formed out of easily assembled, finished modules (52).

19. The vehicle cell according to claim 18, wherein a plane fabric reinforcement (45) or a surface lamination (46) for the interior is integrated into the modules.

20. The vehicle cell according to claim 1, wherein non-load-bearing plane plastic components (54) manufactured by injection molding are affixed as an outside of a vehicle body.

* * * * *